United States Patent
Wang et al.

(10) Patent No.: US 7,912,118 B2
(45) Date of Patent: Mar. 22, 2011

(54) HYBRID DOMAIN BLOCK EQUALIZER

(75) Inventors: Xianbin Wang, Kanata (CA); Yiyan Wu, Kanata (CA); Benoit Ledoux, Gatineau (CA); Sebastien Lafleche, Gatineau (CA); Gilles Gagnon, Gatineau (CA)

(73) Assignee: Her Majesty the Queen in right of Canada, as represented by the Minister of Industry, Through the Communications Research Centre Canada, Ottawa (CA)

( * ) Notice: Subject to any disclaimer, the term of this patent is extended or adjusted under 35 U.S.C. 154(b) by 1211 days.

(21) Appl. No.: 11/524,275

(22) Filed: Sep. 21, 2006

(65) Prior Publication Data

US 2007/0064824 A1   Mar. 22, 2007

Related U.S. Application Data

(60) Provisional application No. 60/719,218, filed on Sep. 22, 2005.

(51) Int. Cl.
*H03K 5/159* (2006.01)
(52) U.S. Cl. ...................................................... 375/229
(58) Field of Classification Search .......... 375/229–236, 375/260; 333/18, 28 R; 708/300, 322, 323; 379/340, 398
See application file for complete search history.

(56) References Cited

U.S. PATENT DOCUMENTS

| 6,011,813 | A | 1/2000 | Ghosh |
| 6,559,894 | B2 | 5/2003 | Omura et al. |
| 6,687,317 | B1 | 2/2004 | Koo |
| 6,700,930 | B1 | 3/2004 | Citta et al. |
| 6,856,649 | B2 | 2/2005 | Birru |
| 6,901,244 | B1 | 5/2005 | Galperin et al. |
| 7,010,030 | B2 | 3/2006 | Vaidyanathan |
| 7,042,937 | B2 | 5/2006 | Birru |
| 7,050,491 | B2 | 5/2006 | McDonald et al. |
| 2003/0108094 | A1* | 6/2003 | Lai et al. ................ 375/222 |
| 2004/0028148 | A1* | 2/2004 | Dowling ................ 375/296 |

OTHER PUBLICATIONS

Al-Dhahir et al, "Ou finite word length effects for the FIR MMSE-DFE", IEEE Comm Ltrs, vol. 45, No. 8, pp. 238-240, Aug. 1998.
Karam et al, "Frequency-Domain equalization of mobile radio and terrestrial broadcast channels", Proc. Globe Com '94, San Francisco, CA, Nov.-Dec. 1994, pp. 1-5.
Sari et al, "Transmission Techniques for digital terrestrial TV broadcasting," IEEE Common. Mag., Nol. 33, No. 2, eb 1995, pp. 100-109.
Falconer et al, "Frequency domain equalization for single-carrier broadband wireless systems", IEEE Comm. Magazine, vol. 40, Issue 4, Apr. 2002, pp. 58-66.

* cited by examiner

*Primary Examiner* — Sam K Ahn
(74) *Attorney, Agent, or Firm* — Teitelbaum & MacLean; Neil Teitelbaum; Doug MacLean

(57) ABSTRACT

The invention provides a method and device for iterative hybrid time-frequency domain block equalization of signals received via a communication channel subject to multipath interference. The equalization method includes frequency-domain equalization of blocks of received signals in a forward path, and time-domain inter-block echo correction and intra-block cyclic echo addition in the feedback path. The invention can be used for equalizing signals transmitted without cyclic prefix and subjected to multi-path interference with long delay spread.

23 Claims, 10 Drawing Sheets

Transmitted Signal

Received Signal

HYBRID DOMAIN BLOCK EQUALIZER

CROSS-REFERENCE TO RELATED APPLICATIONS

The present invention claims priority from U.S. Provisional Patent Application No. 60/719,218 filed Sep. 22, 2005, entitled "A Hybrid Domain Block Equalizer With Iterative Interference Cancellation For ATSC 8-VSB Receiver", which is incorporated herein by reference.

TECHNICAL FIELD

The present invention generally relates to wireless communications, and more particularly to hybrid time-frequency domain iterative methods of equalizing and demodulating of received single-frequency wireless communication signals subjected to the multi-path interference, and to hybrid channel equalizers implementing such methods.

BACKGROUND OF THE INVENTION

In a receiver system, the channel equalizer is an essential component, improving the bit error rate (BER) by correcting the received signal for the effects of the channel. Multi-path interference, which is commonly referred to in the art simply as the multipath, presents particular problems for wireless communication systems, where a transmitted signal may arrive at the receiver over multiple transmission paths. For example, in a system having a single transmitter, the multi-path transmission of a signal may occur because of signal reflection, so that the receiver receives a transmitted signal and one or more reflections of the transmitted signal. As another example, the multipath transmission of a signal may occur in a system having plural transmitters that transmit the same signal to a receiver using the same carrier frequency. A network which supports this type of transmission is typically referred to as a single frequency network (SFN).

One example of a wireless communication system wherein multi-path interference may present particular problems at the receiver is the broadcasting of a digital television (DTV) signal. In the United States, DTV broadcasting has been done using vestigial-sideband (VSB) modulation format in accordance with the Digital Television Standard, the latest edition of which published in December 2005 by the Advanced Television Systems Committee (ATSC) as Document A/53E. The ATSC-VSB data stream as specified by the ATSC has two modes. The first mode designed for terrestrial broadcasting, modulates data onto an RF data carrier frequency signal using 8 levels to represent data symbols of 3 bits each. This is known as 8 VSB. A second mode is available for higher band width cable transmissions which modulates the information using 16 levels of 4 bits each (16 VSB). Although the invention is described herein in connection with the 8 VSB mode, it is equally applicable for use 16 VSB mode. In a terrestrial DTV transmitter, the 8 VSB DTV signal is transmitted with a suppressed very-high-frequency (VHF) or ultra-high-frequency (UHF) natural carrier, with a fixed-amplitude pilot carrier corresponding in frequency and phase with the suppressed natural carrier.

As described in "ATSC Digital Television Standard" and illustrated in FIG. 1, television data is transmitted as data frames. Each data frame begins with a first data field sync segment followed by three hundred and twelve data segments, and then a second data field sync segment followed by another 312 data segments. Each segment consists of four symbols of segment sync followed by 828 symbols of data. Each data field sync segment includes a training sequence used for channel estimation in the receiver.

Receiver performance in the presence of multipath has been considered as one of the main weaknesses of the 8-VSB modulation used in the ATSC system. The introduction of the single frequency network with multiple transmitters for delivering the DTV signal brings new challenges for the ATSC equalizer design, since the delay spread of a multipath channel under such scenario becomes significantly longer than in the traditional broadcasting practice of using one high power facility to cover a wide area, where the multipath distortion are from reflected echoes. This is illustrated in FIG. 2A, which by way of example shows a simple DTV SFN having three transmitters 11, 12 and 13 with their respective coverage areas 21, 22 and 23. An ATSC DTV receiver 16 is located where all three coverage areas overlap.

FIG. 2B illustrates individual channel impulse responses 31, 32 and 33 that are associated with the signal transmissions from the transmitters 11, 12 and 13, respectively. Although all three transmitters transmit the DTV signal synchronously, the receiver 16 receives this signal from the transmitters 11, 12 and 13 with different time delays $t_1$, $t_2$ and $t_3$, and with a different phase. The overall signal 35 at the receiver 16 is a sum of the signals 31, 32 and 33 from each individual transmitter.

The component of the broadcast DTV signal to which a DTV receiver synchronizes its operations is called the principal signal, and the principal signal is usually the strongest component of the broadcast DTV signal. The direct line-of-sight path from the closest transmitter is usually the path resulting in the strongest component of the broadcast DTV signal, if the direct line-of-sight path is not blocked by any intervening barrier to transmission; it is commonly referred to as the main path. Therefore, the multipath signal components of the broadcast TV signal received over other paths and from other transmitters are usually delayed with respect to the principal signal and appear as lagging multipath, signals resulting in the presence of echoes in the received signal. For the example shown in FIGS. 2A, B, the main path is the direct path between the Tx 13 and the Rx 16, the signal 31 is the main signal, and signals 32 and 33 are echoes resulting in the multi-path interference at the receiver 16 which should be equalized, or canceled by the receiver's equalizer for successful reception of the DTV signal.

It is possible however, that the direct or shortest path signal is not the signal to which the receiver synchronizes. When the receiver synchronizes its operations to a longer path signal that is delayed with respect to the direct signal, there will be a leading multipath component caused by the direct signal. There may also be other leading signals caused by other reflected signals of lesser delay than the signal to which the receiver synchronizes. In the DTV art the multipath components of received signals are customarily referred to as "echoes". The leading multipath components are referred to as "pre-echoes", and the lagging multipath components are referred to as "post-echoes". The echoes vary in number, amplitude and delay time from location to location and from channel to channel at a given location. FIG. 2C schematically illustrates an impulse response of such a multipath channel having a main path 45 which is not the shortest path, resulting in pre-echo 43 and post-echo 47.

For a satisfactory reception of the ATSC signal, the overall channel impulse response must fit within a time window $T_{EQ}$ of the ASTC equalizer used in the receiver, $T_{EQ}$ being the time window inside which echoes can be 'equalized', i.e. compensated for so as not to affect the receiver performance. For the example shown in FIGS. 2A, B, the maximum propagation time difference between all the transmitters ($t_3-t_1$) should be less than $T_{EQ}$. The equalizer time window limits the allowed propagation path differences between the transmitters, thereby effectively limiting the cell size in a SFN network, and significantly increasing the total number of transmitters needed to deploy the SFN and work hours required to plan, deploy and maintain the SFN.

The amplitudes of correctable echoes are a function of their time displacement from the main signal, and are quickly reduced as the relative time delay increases; i.e. the closer together the multi-path signal components are in time, the stronger they can be in amplitude, and the further apart they are in time, the lower in level the echoes must be for the equalizer to work. Currently, best commercially available ATSC receivers employ time-domain equalizers that can only handle −10 dB echoes from −29.5 μs to 38.5 μs. As the result, the propagation path difference corresponding to different echoes can only be up to around 10 km for the ATSC receivers based on the current time domain equalizer technology. Notably, reflected echoes in urban deployment may substantially increase the propagation path differences among the echoes. It would be thus advantageous to increase the capability of the receiver to handle channels with very long delay spread.

Frequency domain equalizers can be more efficient than time-domain equalizers in handling long delay spreads, and are presently employed in wireless systems based on the Orthogonal Frequency Domain Multiplexing (OFDM), or in wireline Discrete Multitone (DMT) modulation. In these transmission techniques, each N-sample encoded symbol is prefixed with a cyclic extension to allow signal recovery using the cyclic convolution property of the discrete Fourier transform (DFT). Alternatively, the extension may be appended to the end of the signal as well. If the length of the cyclic prefix is greater than or equal to the length of the impulse response, the linear convolution of the transmitted signal with the channel becomes equivalent to a circular, or cyclic convolution (disregarding the prefix). If the channel impulse response is shorter than the length of the periodic extension, the original symbols can then be recovered by transforming the received time domain signal to the frequency domain using the DFT (implemented using, e.g., the FFT), and performing equalization using a bank of single tap frequency domain equalizer (FEQ) filters. For the cyclically extended signals, the FEQ effectively deconvolves (circularly) the signal from the transmission channel response, effectively canceling the echoes and restoring the originally transmitted signal.

However, the cyclic prefix is not available in existing signal carrier modulated broadcast and communication systems, including ATSC and GSM. In addition, if such a cyclic prefix is to be used, its length would have to be longer than the duration of the channel impulse response, which would introduce excessive redundancy and would limit the system throughput when the channel duration is long.

An object of this invention is to provide a hybrid time-frequency domain equalizer for equalizing a signal transmitted in a single frequency network receiver without a cyclic prefix.

Another object of this invention is to provide an efficient hybrid time-frequency domain equalizer for use in ATSC receivers.

Another object of this invention is to provide an iterative hybrid-domain method of channel equalizing for single-carrier signals transmitted without a cyclic prefix.

SUMMARY OF THE INVENTION

In accordance with the invention, a method of channel equalizing is provided for use in a wireless receiver for receiving a signal via a communication channel subjected to multi-path interference, wherein said signal transmitted without a cyclic prefix using a single carrier frequency. The method comprises the steps of: a) receiving a sequence of samples of the transmitted signal, each sample representing a transmitted symbol subjected to channel distortions; b) based on an initial channel estimation, generating a frequency response transfer function ($h_f$) for a block of transmitted symbols of a pre-defined length, and a time-domain channel echo response function ($C_T$); c) iteratively equalizing blocks of samples from the received sequence of samples using a frequency-domain equalization in a feedforward path, and time-domain inter-block echo cancellation and cyclic echo correction in feedback paths.

In accordance with one embodiment of the invention, step (c) of the method comprises the following steps: A) updating a current block by subtracting from a first end portion thereof an estimated contribution of an inter-block echo, said inter-block echo produced from a portion of the transmitted signal preceding the current block; B) performing frequency-domain equalization for the updated current block using the frequency response transfer function to obtain a frequency-equalized block; C) generating symbol estimates for the current block by making decisions on samples of said frequency-equalized block; D) estimating an echo signal from the current block by applying the time-domain channel echo response function to the symbol estimates for the current block; E) updating the current block by cyclically adding the estimated echo signal from the current block to the first end portion of the current block; and, F) repeating steps (B) and (C) to update the symbol estimates for the current block.

Another aspect of the invention provides a hybrid domain channel equalizer for equalizing a signal received via a communication channel in the presence of multi-path interference, said equalizer comprising:

a forward circuit having an input port for receiving an input time-domain signal and an output port for outputting an equalized time-domain signal, said forward circuit comprising a frequency-domain equalizer and a decision circuit; and, a feedback circuit connected between the output port and the input port for producing interference (echo) compensating signals from the equalized time-domain signal in the time domain, and for combining said interference compensating signals with the input time-domain signal at the input port for compensating channel generator echo components of the input signal at the input port.

In a preferred embodiment of this aspect of the invention, the hybrid domain channel equalizer further comprises an input S/P converter for providing the input time-domain signal to the input port in blocks of N signal samples, and the feedback circuit comprises a first feedback loop for inter-block echo cancellation, and a second feedback loop for intra-block cyclic echo addition.

BRIEF DESCRIPTION OF THE DRAWINGS

The invention will be described in greater detail with reference to the accompanying drawings which represent preferred embodiments thereof, wherein:

FIG. 4c is a diagram illustrating the effect of the multipath channel shown in FIG. 4b on the three consecutive blocks of transmitted symbols shown in FIG. 4a;

DETAILED DESCRIPTION

The following notations are used in this specification: matrix quantities are denoted using upper-case bold characters, e.g. C, vector quantities are denoted using lower-case bold characters, e.g. x, scalar quantities are denoted in lower-case italics, with the notation x(n) or $x_n$ denoting an n-th element of a vector x, with 'n' representing a time sample. The notations DFT{x} and IDFT{x} denote a digital Fourier transform (DFT) operation on a vector x and a corresponding inverse operation, respectively, with FFT{x} and IFFT{x} denoting the fast Fourier transform (FFT) and its inverse operation (IFFT), respectively.

In addition, the following is a partial list of abbreviated terms and their definitions used in the specification:
ASIC Application Specific Integrated Circuit
BER Bit Error Rate
DSP Digital Signal Processing
FPGA Field Programmable Gate Array
ISI Inter-symbol Interference
IBI Inter-Block Interference
IABI Intra-Block Interference
PN Pseudo Random
RF Radio Frequency
HF High Frequency
UHF Ultra High Frequency
CC Central Controller
CIR Channel Impulse Response The instant invention provides a method and apparatus for iterative hybrid-domain equalizing of a signal received via a communication channel with multipath interference characterized by long delay spread and long echoes. The multipath distortion in the received signal is first tentatively removed with a frequency domain equalizer on a block-by-block basis. A time domain interference cancellation algorithm is then used to cancel the inter-block interference (IBI) and intra-block interference (IABI) in the time domain, based on tentative decisions from the frequency domain equalizer. These two steps are iterated until desired receiver performance is achieved.

Figure 5:
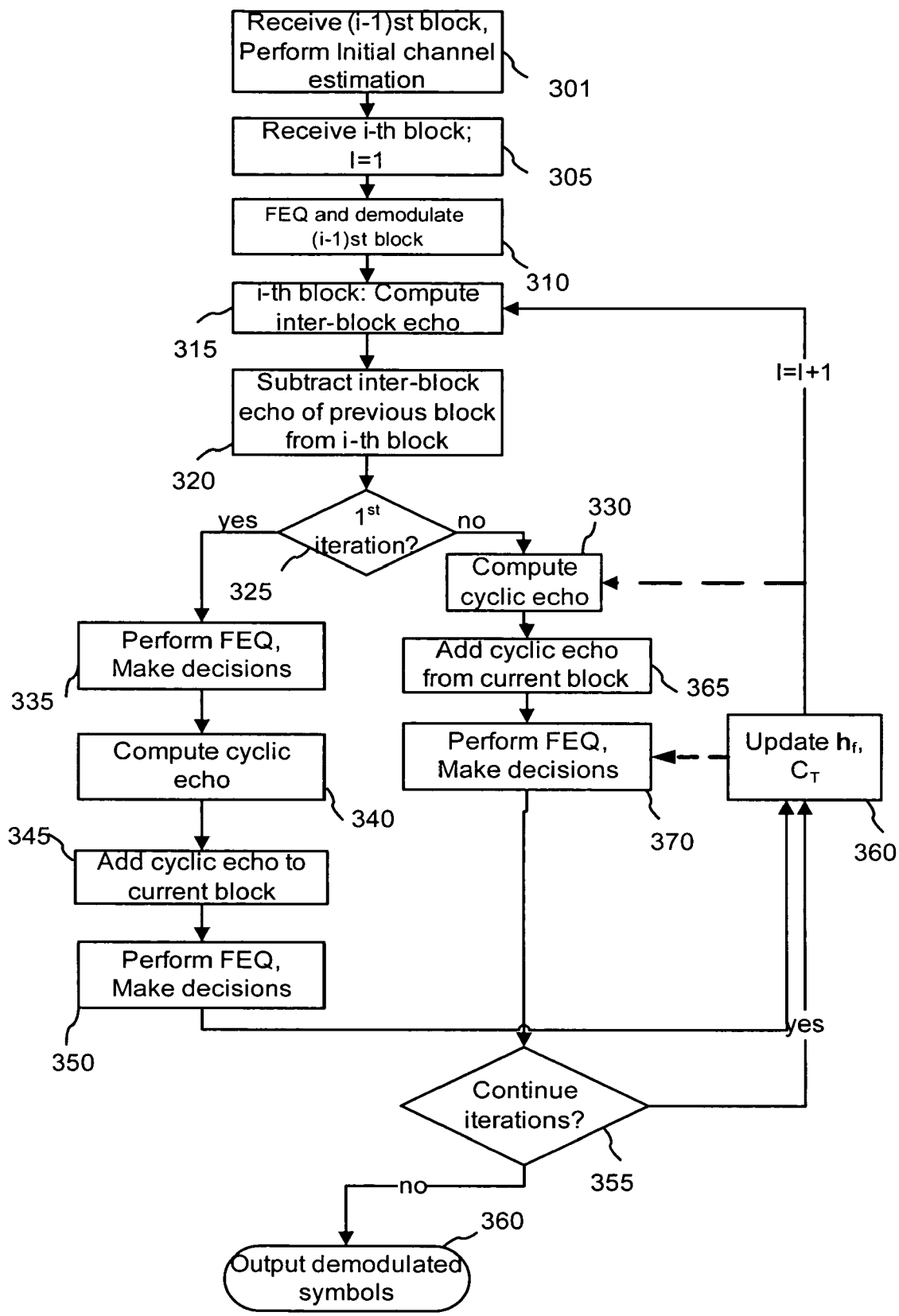
FIG. 5 is a flowchart of the iterative equalization method of the present invention in a first embodiment thereof.

Exemplary embodiments of the method of signal equalization of the current invention and of the equalizer realizing this method will now be described with reference to diagrams shown in FIGS. 3 and 6, wherein each block represents a functional unit of the receiver adopted to perform one or several steps of the method of signal equalization of the present invention; these steps will also be described hereinafter in conjunction with the description of the corresponding functional units of the equalizer, and with reference to method charts in FIGS. 5, 7, and 9. The various functional units shown as blocks in FIGS. 3, 6 can be integrated or separate structures implemented in either software or hardware or a combination thereof commonly known to provide functionalities described hereinbelow, including DSPs, ASICs, FPGAs, and analogue RF, HF and UHF circuitry.

Furthermore, the invention will be described herein with reference to an ATSC DTV receiver 100 for receiving an 8-VSB modulated DTV signal, where 8-VSB denotes the vestigial sideband modulation with 8 discrete amplitude levels. However, one skilled in the art will appreciate that the invention can also be used for equalizing other types of communication signals, in particular those transmitted without the use of cyclic extension such as cyclic prefix via a communication channel subject to multipath interference.

Figure 3:
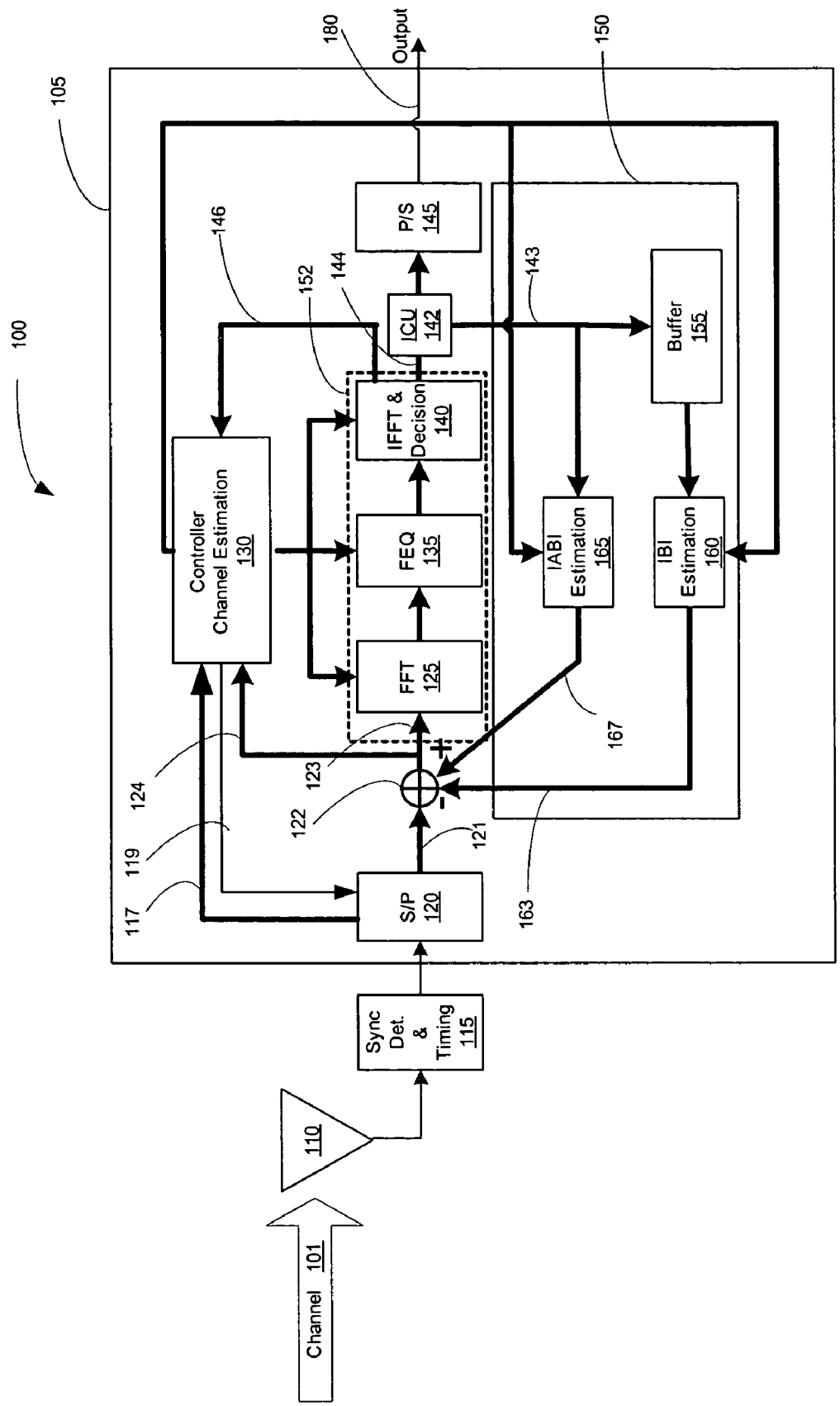
FIG. 3 is a diagram of the single-frequency receiver with a hybrid equalizer according to an embodiment of the present invention.

FIG. 3 illustrates an application of the iterative hybrid-domain equalizer (IHDE) 105 of the present invention in one embodiment thereof in an ATSC DTV receiver 100. Those skilled in the art will perceive that FIG. 3 does not explicitly depict all components within the DTV receiver 100 of the exemplary embodiment. Only so much of the commonly known construction and operation of a DTV receiver and the components therein as are unique to the present invention and/or required for an understanding of the present invention are shown and described herein. Note also that functioning of the equalizer 105 of the present invention is described herein using mathematical formulas that are derived under certain assumptions and approximations; these assumptions and approximations are used for clarity of the description and for illustration purposes, and should not be considered as limiting the scope of the invention.

Figure 1:
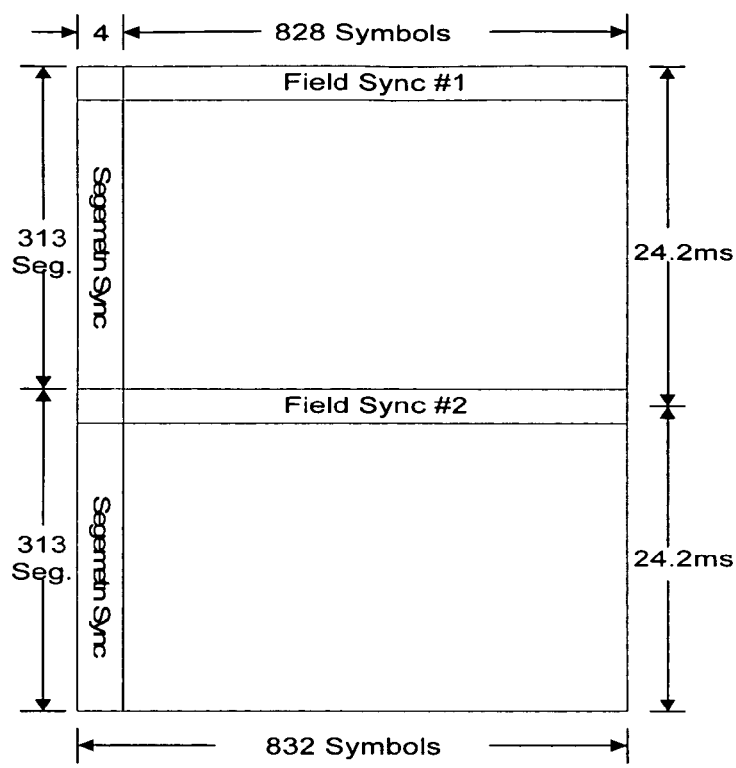
FIG. 1 is a diagram of the VSB data frame of the ATSC DTV signal.
Figure 2A:
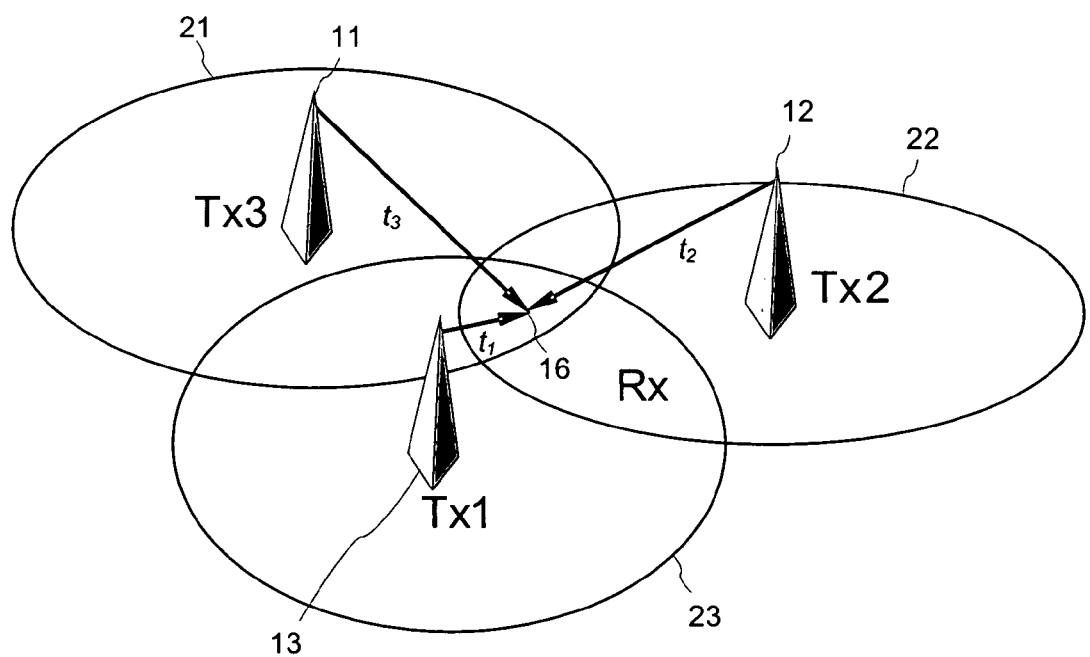
FIG. 2A is a schematic diagram illustrating an SFN with three transmitters and one receiver.
Figure 2B:
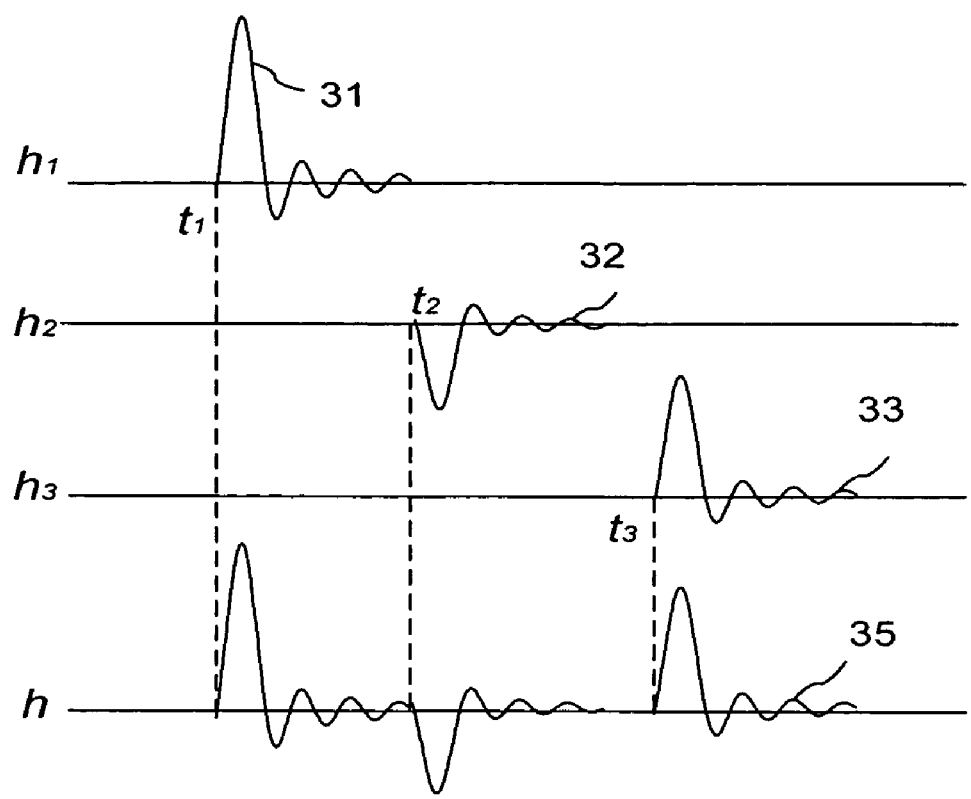
FIG. 2B is a diagram illustrating the composition of the channel impulse for the SFN shown in FIG. 1.
Figure 2C:
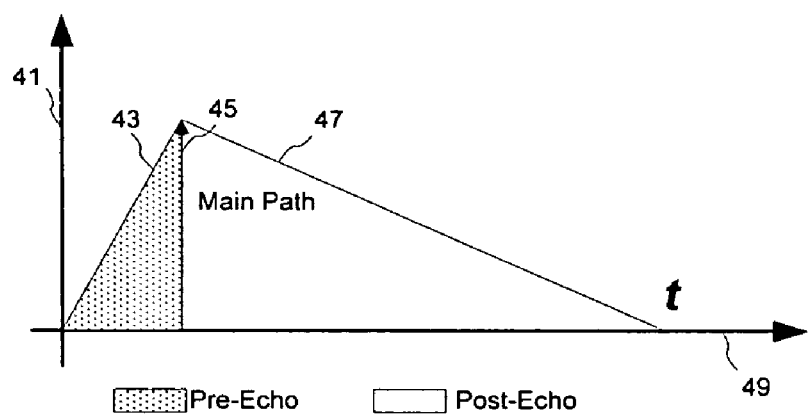
FIG. 2C is a diagram illustrating a channel impulse response with pre-echo and post-echo.

As show in the simplified diagram of FIG. 3, the ATSC receiver 100 includes an RF receiving unit 110 that receives an ATSC signal via a multipath communication channel 101, a synchronous detector (SyncD) 115, and the iterative hybrid-domain equalizer (IHDE) of the present invention 105. The RF receiving unit 110 conventionally includes an RF antenna, a tuner including one or more local oscillators and RF mixers, which are well known in the art and not shown or described herein, for down-converting the received ATSC 8-VSB signal. The RF receiving unit 110 thereby converts the received RF signal into a baseband signal $r_m(t)$, or into an IF signal $r_{IF}(t)=r_m(t)\exp(j\omega_{IF}t)$. The down-converted signal is then passed to the SyncD unit 115, which may include an IF filter and circuitry for clock recovery and timing synchronization, and an A/D converter; the SyncD 115 converts the down-converted analogue DTV signal into a stream of signal samples corresponding to transmitted 8-VSB symbols. The clock and timing synchronization are performed using known properties of the ATSC signal frame shown in FIG. 1 described in further detail in ATSC Doc.A/53E, and in ATSC Standard A/54A: Recommended Practice: Guide to the Use of the ATSC Digital Television Standard, Dec. 4, 2003, which are incorporated herein by reference. The SyncD unit 115 is coupled to the IHDE 105 and in operation passes thereto a sequence, or stream, of samples $\{r(t_j)\}=\{r_j\}$, $j=0, 1, \ldots$ of the transmitted signal, wherein each sample represents a transmitted symbol subjected to multipath distortions in the channel 101.

In one embodiment, the SyncD unit 115 also performs preliminary blind channel estimation using one of the known in the art techniques, and generates at least a preliminary estimate for a time-domain channel impulse response (CIR) function, which for the purpose of this description will be represented as a vector h having L elements $h_n$ commonly referred to as CIR tap coefficients:

$$h=[h_0, h_1, \ldots, h_{L-1}]^T, \quad (1)$$

where the superscript '$T$' denotes the operation of the matrix/vector transposition. In another embodiment, the CIR estimation is done in a central controller unit 130 of the IHDE 105, which includes functional blocks schematically shown in FIG. 6 and will be described hereinafter in this specification. Conventional channel estimation techniques using a training sequence, for example the PN511 sequence of the ATSC signal frame shown in FIG. 1, will provide an accurate initial estimate for the CIR h, while dynamic tracking of the channel changes can be implemented using one of known in the art decision-directed techniques, or according to one embodiment of the invention described hereinbelow wherein the channel estimation is iteratively updated by the IHDE 105. In embodiments wherein the receiver 100 can tolerate delay and buffering, the channel impulse response can be tracked by interpolating the channel estimates derived from the periodically inserted PN sequences in the ATSC signal.

Iterative Hybrid Domain Equalizer

The IHDE 105 of the present invention receives the sequence of signal samples $\{r[j]\}$, performs channel equalization and demodulation as described herein below, and provides a sequence of demodulated symbols as its output 180; the output 180 of the IHDE 105 is passed to a decoder, which in the case of the ASTC receiver customarily includes a trellis decoder followed by a data de-interleaver, a Reed-Solomon decoder, and a data de-randomizer; all these elements are well known in the art and not shown in FIG. 3.

The IHDE 105 includes a 1 to N serial-to-parallel (S/P) converter 120 at its input, and an N to 1 parallel-to-serial converter (P/S) 145 at the output; the S/P converter 120 connects to an adder/subtractor 122, which can be embodied as a subtractor followed by an adder, and which in turn connects to an input port 123 of a feed-forward equalizing circuit 152, the feed-forward equalizing circuit 152 having output port 144 that connects to an input port of the P/S converter 145. The adder/subtractor 122 adds signal 167 to signal 121, and subtracts signal 163 from signal 121, to form the time-domain input signal 123 for the forward circuit 152. The results of these adding/subtracting operations are provided to the CC 130 and stored in a buffer 136 therein for use in future iterations, as described hereinbelow. The feed-forward equalizing circuit 152 includes a frequency equalizer (FEQ) unit 135, and will also be referred to herinafter as the forward FEQ circuit 152, or simply as the forward circuit 152. Note that in FIG. 3, thick arrows between various units generally represent parallel connections whereby whole blocks of digitized data are passed in parallel, while thin arrows generally represent serial connections wherein data are passed sequentially; however, one skilled in the art would appreciate that in other embodiments the respective connections can have alternative implementations.

The feed-forward circuit 152 includes a DFT converter 125 for converting a time-domain signal received at the input port 123 into the frequency domain, the FEQ 135 and an IDFT converter 140 for converting the frequency-equalized signal from the frequency domain to the time domain. The IDFT converter 140 includes a decision device for making hard decisions on the frequency-equalized signal to obtain symbol estimates after said frequency-equalized signal is converted to the time domain. In a preferred embodiment, the DFT and IDFT converters 125, 140 use FFT and IFFT algorithms, respectively.

The IHDE 105 of the present invention further includes a time-domain echo-correcting feedback circuit 150, which is connected between the output port 144 of the forward circuit 152 to its input port 123 to provide a time-domain feedback to the forward frequency-equalizing circuit 152. The feedback circuit 150 includes a first feedback loop 142-143-155-160-163-122 for inter-block echo cancellation, and a second feedback loop 142-143-165-163-122 for performing cyclic echo correction, as described hereinafter. The first and second feedback loops of the feedback circuit 150 have a common input 143 which is coupled to the output port 144 of the forward FEQ circuit 152 by means of an iteration control unit (ICU) 142 for switching the output of the IDFT block 140 between the P/S controller 145 and the feedback circuit 150 in dependence on satisfying a pre-determined condition. A central control unit (CC) 130 performs iterative channel estimation and computes various control parameters as described hereinbelow, including the block size N which is then passed to the S/P converter 120; the CC 130 includes a buffer for storing block signals generated by functional units 120, 122, and 140, which are used in the iterative channel estimation.

IHDE Operation

In operation, the stream of signal samples $\{r[j]\}$ is first received by the S/P converter 120, where said stream is converted to a sequence of signal blocks, which are then passed (arrow 121) to the adder block 122 at the input of the forward FEQ circuit 152. Each said block has N samples and is passed within the IHDE 105 using parallel connections. An i-th signal block can be conveniently represented by a vector $r_i$ of size N:

$$r_i=[r_i(0), r_i(1), \ldots, r_i(N-1)]^T, \quad (2a)$$

where $i=0,1,\ldots$ denotes a sequence number of the block.

In the embodiment shown in FIG. 3, the signal block $r_i$ is optionally passed to a central controller (CC) 130 of the IHDE 105 of the present invention, as schematically shown by a bold arrow 117, wherein it can be used for the initial estimation of the CIR h if such an estimation has not yet been performed based on previously received signal blocks. The CC 130 controls the size N of the S/P 120 as schematically shown with an arrow 119 and described hereinafter.

An i-th received block $r_i$ is related to a block of N transmitted symbols represented by a vector $x_i$ $$x_i=[x_i(0), x_i(1), \ldots, x_i(N-1)]^T \quad (2b)$$

through an operation of convolution with the channel impulse response:

$$r_i=h \otimes x_i + w_i \quad (3a)$$

where vector $w_i$ represents an additive white Gaussian noise (AWGN) and has the same size as r and x. Relation (3a) can be equivalently expressed through the following matrix equation:

$$r = \begin{bmatrix} h_0 & 0 & \cdots & \cdots & \cdots & 0 \\ h_1 & h_0 & \cdots & \cdots & \cdots & 0 \\ \vdots & \ddots & \ddots & \ddots & \ddots & \vdots \\ h_{L-1} & \cdots & h_1 & h_0 & \cdots & \cdots \\ 0 & \cdots & \cdots & \cdots & \cdots & 0 \\ \vdots & \ddots & \ddots & \ddots & \ddots & \vdots \\ \cdots & \cdots & h_{L-1} & \cdots & h_1 & h_0 \\ \cdots & \cdots & \cdots & h_{L-1} & \cdots & h_1 \\ \vdots & \ddots & \ddots & \ddots & \ddots & \vdots \\ 0 & \cdots & \cdots & \cdots & 0 & h_{L-1} \end{bmatrix} \cdot x + w \quad (3b)$$

The matrix in the right-hand-side (RHS) of equation (3b), of size (N+L−1)×N, where L is the channel length, describes the effect of the channel including the multipath interference and is composed of the CIR coefficients $h_n$, the subscript 'i' denoting the block's position in the transmitted sequence is omitted for simplicity.

Figure 4A:
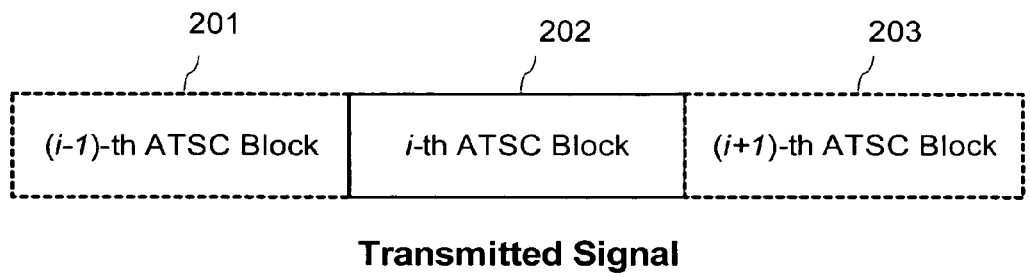
FIG. 4a is a diagram illustrating three consecutive blocks of transmitted symbols.
Figure 4B:
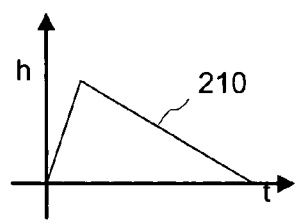
FIG. 4b is a diagram illustrating a triangular impulse response of a multi-path channel.
Figure 4C:
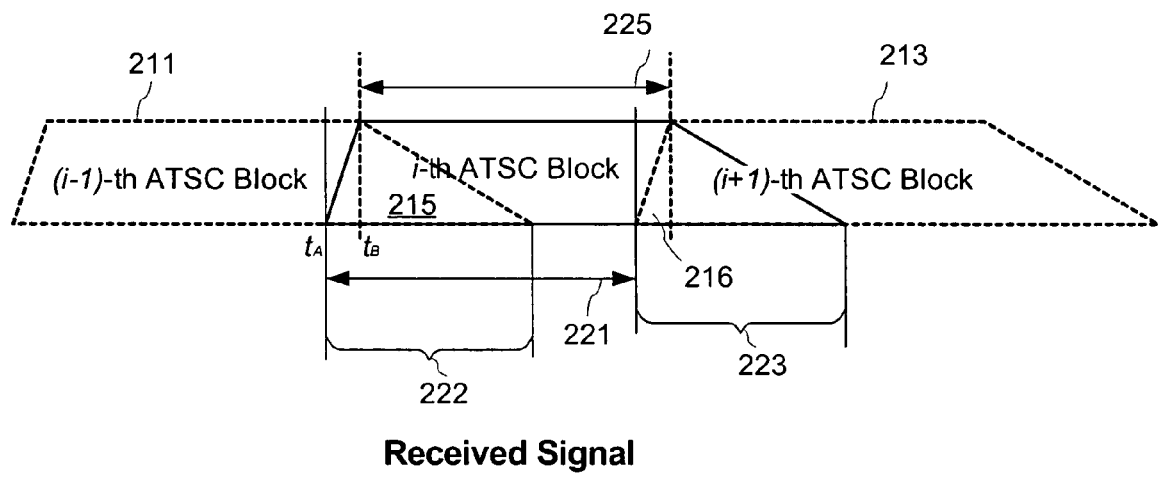

FIGS. 4a-4c illustrate graphically the effect of a static multi-path channel on three consecutive blocks of symbols $x_{i-1}$, $x_i$ and $x_{i+1}$. In FIG. 4a, these symbol blocks before the transmission over the channel are labeled with reference numerals 201, 202 and 203, respectively, with the horizontal direction representing time, and the vertical direction representing relative signal power. The multipath CIR 210 of the communication channel is shown in FIG. 4a and has a triangular shape, resulting in a trapezoidal spread of each of the symbol blocks 201-203 into the adjacent blocks windows as they are received at the receiver 100, as schematically shown in FIG. 4c by the shaded areas 211 and 213 representing received signal corresponding to the transmitted symbol blocks 201 and 203. In particular, during the time interval 222 signals corresponding to blocks 201 and 202 overlap resulting in inter-block interference (IBI). Similarly, during the time interval 223 signals corresponding to blocks 202 and 203 overlap and interfere with each other. For successful demodulation of symbols e.g. of the i-th ATSC block in the overlap intervals, the interferences from the adjacent blocks have to be cancelled.

As can be seen from FIG. 4c, due to the multi-path spread of the transmitted blocks, the i-th ATSC signal block can be theoretically demodulated from a portion of the signal received starting at any time instance during the time interval 222. However, different observation periods (OP), i.e. time windows of duration (N−1)$T_s$, $T_s$ being a symbol duration, wherein the i-th block is demodulated, lead to different approaches to the multi-path interference cancellation for the equalization of the i-th block.

For instance, if OP 225 is chosen for the demodulation of the i-th block, then both a post-echo 215 of the previously transmitted block 201, and a pre-echo 216 from the following symbol block 203 have to be estimated and cancelled. On the other hand, if an observation period 221, is chosen instead for the demodulation of the i-th block, then only the IBI associated with the post-echo 222 from the preceding block 201, needs to be cancelled.

Comparing OP 221 and OP 225, we find that there is slightly more IBI in OP 221 although the overall number of IBI corrupted samples is identical for the two OPs. However, a disadvantage of using OP 225 for demodulation of the i-th block 202 is that the IBI from the pre-echo 216 of the (i+1)-th block 203 has to be cancelled during the demodulation of the i-th block. This cancellation may not be accurate since information about the (i+1)-th block is not yet available at the time of demodulation of the i-th block 202. In addition, iterative IBI cancellation from two adjacent signal blocks is much more complicated than the IBI cancellation from only the preceding signal block. Based on the aforementioned observations, the method of the present invention in its preferred embodiment uses the OP 221 for the demodulation of the i-th block, so that only the post-echo from the preceding (i−1)st block needs to be cancelled.

The following description provides a mathematical foundation for the method of iterative hybrid-domain equalization of the present invention that the IHDE 105 implements.

First, we note that the rectangular matrix in the RHS of equation (3b) may be decomposed into two N×N matrices that are more convenient for analysis of the inter-block interference (IBI) and intra-block interference (IABI), wherein the later refers to inter-symbol interferences (ISI) for symbols within the same signal block x, which includes the aforedescribed multi-path induced echoes. The first matrix, $$C = \begin{bmatrix} h_0 & 0 & \cdots & \cdots & \cdots & 0 \\ \vdots & \ddots & \ddots & \ddots & \ddots & \vdots \\ h_{L-1} & \cdots & h_0 & \cdots & \cdots & \cdots \\ 0 & h_{L-1} & \cdots & h_0 & \cdots & \cdots \\ \vdots & \ddots & \ddots & \ddots & \ddots & \vdots \\ 0 & \cdots & \cdots & \cdots & \cdots & 0 \\ 0 & \cdots & 0 & h_{L-1} & \cdots & h_0 \end{bmatrix}, \quad (4)$$

represents the effect of the communication channel 101 on a signal block, e.g. the block 202 in FIG. 4a, when it is processed in the time window 222, and when the echo from the preceding block 201 is absent.

The second matrix, $$C_T = \begin{bmatrix} 0 & 0 & \cdots & h_{L-1} & \cdots & h_1 \\ \vdots & \ddots & \ddots & \ddots & \ddots & \vdots \\ \cdots & \cdots & \cdots & \cdots & \cdots & h_{L-1} \\ \cdots & \cdots & \cdots & \cdots & \cdots & 0 \\ \vdots & \ddots & \ddots & \ddots & \ddots & \vdots \\ 0 & \cdots & \cdots & \cdots & \cdots & 0 \end{bmatrix}, \quad (5)$$

represents the tail end of the channel's impulse response that gives rise to the inter-block echoes, e.g. echoes 222 and 223 in FIG. 4c, which are responsible for the IBI in the following blocks; this matrix will also be referred to hereinafter as the echo response function, since it generates a time-domain echo $e_i$ of an i-th block:

$$e_i = C_T \cdot x_i \quad (6)$$

Using these two matrices, equation (3b) can be re-written in the following form $$r_i = C \cdot x_i + C_T \cdot x_{i-1} + w, \quad (7)$$

which expresses the i-th signal block received in the observation period 225 as a sum of the channel-distorted symbol block 201, which is represented by the first term in the RHS of equation (7), and the previous block echo signal $e_{i-1} = C_T \cdot x_{i-1}$.

Next, we note that the two matrices C and $C_T$ have a very useful property that their summation produces a cyclic matrix $C_{cycl}$, $$C + C_T = C_{cycl}. \quad (8)$$

Advantageously, the cyclic matrix $C_{cycl}$ is a matrix that generates the operation of a cyclic convolution of the transmitted signal with the channel when applied to a signal block vector:

$$y_i = C_{cycl} x_i;  \quad (9)$$

Those skilled in the art will appreciate that, would the cyclic block vector $y_i$ on the RHS of equation (8) be known, the originally transmitted symbol block $x_i$ could be easily obtained using a frequency-domain equalizer with a single-tap frequency filter. Indeed, in the frequency domain the operation of the cyclic convolution in the RHS of eq. (9) corresponds to a simple element-by element multiplication of the channel frequency response transfer function $$h_f = DFT\{h\}, \quad (10)$$

wherein the size of DFT in equation (10) is N, and the Fourier-transformed transmitted symbol block $x_i$, so that:

$$DFT\{y_i\} = h_f DFT\{x_i\}. \quad (11)$$

The following equation for the cyclic block vector $y_i$ can be obtained from equations (3b)-(9):

$$y_i = r_i - e_{i-1} + e_i, \quad (12)$$

where the noise term w is omitted for the sake of clarity of the following description, and because the signal reception for the DTV networks is typically limited by the multipath distortions associated with the terms $e_{i-1} = C_T \cdot x_{i-1}$, and $e_i = C_T \cdot x_i$, rather than by noise.

Note that the operation ($r_i + e_i$) in the RHS of equation (12) can be described as a cyclic addition of an echo from a tail end portion of the current block, said echo corresponding in FIG. 4c to a contribution of the i-th block into the received signal within the time interval 223, to a first, or leading end of the i-th block within the time interval 222. Hence, the operation described by equation (12) can be referred to as a cyclic substitution of the inter-block echo component $e_{i-1}$, i.e. of the echo of the preceding (i-1)st symbol block $x_{i-1}$, with the echo of the current block $e_i$.

Equation (11) provides a mathematical foundation for the iterative signal equalization method of the present invention and for the operation of the IHDE 105, wherein equalization and demodulation of the i-th received signal block can be described as substantially including the following three general steps:

I) performing inter-block echo cancellation by subtracting from the received i-the signal block $r_i$ the echo $e_{i-1}$ from the previously received and demodulated block; an estimate for this inter-block echo can be computed as $$e_{i-1} = C_T \hat{x}_{i-1} \quad (13)$$

where $\hat{x}_{i-1}$ is a previously obtained vector of decisions for the (i-1)st block;

II) performing cyclic echo correction by cyclically adding the echo $e_i$ of the current i-th block to the first, or leading end portion of the current block; and, III) performing frequency equalization of the resulting vector $y_i$ to obtain an equalized "soft decisions" vector $x|_{FEQ}$, and the 'hard decisions' vector $\hat{x}$ according to the following equations (14a, b):

$$x|_{FEQ} = IDFT\left\{\frac{DFT\{y_i\}}{h_f}\right\} \quad (14a)$$

$$\hat{x} = D\{x|_{FEQ}\} \quad (14b)$$

wherein the division in the RHS of equation (14a) is the element-by-element division, and $D\{x\}$ denotes the operation, also referred herein as the demodulation, of making hard decisions on a 'soft' input vector x.

However, these steps, or at least the steps (II) and (II) have to be performed iteratively, since the step (II) of the cyclic echo addition requires at least an estimate of the symbols $x_i(n)$ for the current block $x_i$, which is the block that is being currently equalized and demodulated.

Main steps of the iterative hybrid-domain equalization method of the present invention will now be described more in detail with reference to FIG. 5, considering by way of example the process of equalization and demodulation, i.e. obtaining the hard symbol estimates $\hat{x}_i$, of the i-th received signal block $r_i$.

We first assume that at the time instance when the previous, (i-1)st signal block $r_{i-1}$ is received, neither a channel estimation, nor any information of the preceding signal is available, and therefore the $(i-1)^{st}$ signal block $r_{i-1}$ has to be demodulated in the same iterative process that is used for demodulation of the current i-th block. This process is based on the following iterative equations (15)

$$z_i^{(I)} = r_i - C_T^{(I)} \hat{x}_{i-1}^{(I)}, \quad (15a)$$

$$y_i^{(I)} = z_i^{(I)} + C_T^{(I)} \hat{x}_i^{(I)}, \quad (15b)$$

$$x_i^{(I)} = IDFT\left\{\frac{DFT\{y_i^{(I)}\}}{h_f^{(I)}}\right\} \quad (15c)$$

where $\hat{x}_{i-1}^{(I)}$ and $\hat{x}_i^{(I)}$ are symbol estimates of $x_{i-1}$ and $x_i$ after I iterations, $z_i^{(I)}$ is an IBI-corrected i-th signal block, and $x_i^{(I)}$ denotes the result of the frequency-domain equalization of the current signal block with cyclic echo correction $y_i^{(I)}$ in the $I^{th}$ iteration.

In this embodiment the method starts with receiving the (i-1)st and the i-th signal blocks $r_{i-1}$ and $r_i$ by the IHDE 105 in steps 301 and 305, and passing copies thereof from the S/P converter 120 to the central controller 130 for storing in a buffer therein and for performing the initial, tentative channel estimation, e.g. using one of the known in the art methods. This results in an initial estimate for the CIR vector h, using which the controller 130 computes estimates of the frequency response transfer function $h_f$ and the echo response function $C_T$. In an alternative embodiment, the step of the initial channel estimation can be performed outside of the IHDE 105, e.g. by the block 115, and the resulting estimate for the CIR h is passed to the CC block 130.

In one embodiment of the invention, the S/P converter 120 divides the received sequence of samples $\{r(n)\}$ in overlapping blocks of samples, so that the leading portion of the i-th block $r_i$ is a copy of the trailing portion of the preceding (i-1) block $r_{i-1}$, for all i=0,1, .... This block overlapping helps to avoid a decrease in the signal-to-noise ratio (SNR) at the beginning of each block after the removal of the inter-block echo as described hereinbelow. In a preferred embodiment, the length of the overlapping block portions is chosen to be substantially equal to the channel length L, a method for estimating thereof described hereinbelow; as a result. In this embodiment the first L elements $r_i(0), r_i(1), \ldots, r_i(L-1)$ of the vector $r_i = [r_i(0), r_i(1), \ldots, r_i(N-1)]$ representing the i-th signal block repeat, i.e. are copies of, the last L elements $r_{i-1}(N-L)$, $r_{i-1}(N-L+1), \ldots, r_{i-1}(N-1)$ of the vector $r_{i-1} = [r_{i-1}(0), r_{i-1}(1), \ldots, r_{i-1}(N-1)]$ representing the i-th signal block, so that $r_i(n) = r_{i-1}(N-L+n)$ for n=0, ..., L-1. The block overlapping is advantageous for channels with very long duration, when there is a transient period at the beginning of the transmission before the received signal power reaches its peak. As a result, the tentative decisions for the first, leading portion of the current block may not be very reliable due to the signal-to-noise ratio (SNR) decrease in the IBI corrupted signal at the beginning of each block after the removal of the IBI echo.

Next, in a first iteration of the method, I=1, the (i−1)st signal block $r_{i-1}$ is passed in step 310 through the forward FEQ circuit 152, which operation can be described by equations (12a, b). In this step, the FEQ unit 135 uses the current preliminary estimate $h_f^{(1)}$ of the frequency response transfer function $h_f$, which is provided by the CC 130, to tentatively equalize the (i−1)st signal block $r_{i-1}$. This step results in a first-iteration estimate of the time-domain decision vector $\hat{x}_{i-1}^{(I)}$ for the (i−1)st block.

Next, in a step 315 the decision vector estimate $\hat{x}_{i-1}^{(I)}$ is used by the IBI estimator 160, which is also referred to herein as the inter-block echo estimator, to compute a 1st estimate (I=1) of the inter-block echo signal $e_{i-1}^{(I)}$ using the initial estimate for the echo matrix $C_T$ provided by the CC 130, which we will denote $C_T^{(I)}$, I=1:

$$e_{i-1}^{(I)} = C_T^{(I)} \hat{x}_{i-1}^{(I)} \tag{16}$$

The processing of the current, $i^{th}$ received signal block $r_i$ starts in a step 320, wherein said received current block is updated by subtracting therefrom the estimated inter-block echo $e_{i-1}^{I}$; this is done according to equation (15a), as the cyclic echo estimate for the current block is not yet available. The resulting updated signal block $z_i^{(I=1)}$ in step 335 is frequency equalized to obtain a frequency-equalized block, which is demodulated by making decisions on samples of said frequency-equalized block to generate hard symbol estimates $\hat{x}_i^{(I)}$ for the current i-th block; step 335 is performed using the forward FEQ circuit 152.

In a next step 340, an estimate $e_i^{(I)}$ of the i-th block echo signal $e_i$ is computed by the cyclic echo estimator 165 according to $$e_i^{(I)} = C_T^{I-1} \hat{x}_i^{(I)} \tag{17}$$

and then cyclically added in step 345 to the previously updated current block $z_i^{(I=1)}$ in accordance with eq. (15b) to obtain a cyclically updated first block $y_i^{(I)}$ in the first iteration of the method; a copy of this signal block is provided to the CC 130 for storing in the buffer 136 shown in FIG. 6.

In a next step 350, vector $y_i^{(I)}$ is frequency equalized according to equation (15c) and demodulated by passing thereof through the forward FEQ circuit 152 as described hereinabove, resulting in a 'soft' equalized vector $x_i^{(I)}$, and a vector of hard symbol decisions $\hat{x}_i^{(I+1)} = D\{x_i^{(I)}\}|$; this step completes the first iteration of the method.

In step 360, the hard decisions vector $\hat{x}_i^{(I+1)}$ is passed to the central controller 130, and used therein to update the channel response estimate, i.e. the CIR h, and therefrom obtain a new estimate $h_f^{(I+1)}$ of the frequency response function $h_f$, and a new estimate $C_T^{(I+1)}$ of the echo response function $C_T$. The new CIR estimate can be computed directly as a CIR that is required to transform the hard decisions vector $\hat{x}_i^{(I+1)}$ into the cyclically updated current signal block vector $y_i^{(I)}$, a copy of which is stored in the buffer 136 of CC 130. The updated frequency response function estimate $h_f^{(I+1)}$ is provided to the FEQ unit 135, while the updated echo response function estimate $C_T^{(I+1)}$ is provided to the IBI estimator 165, and the cyclic echo estimator 160.

Next, the iteration index I is increased by one, i.e. I→I+1, and the equalization process returns to step 315, wherein the IBI echo from the (i−1) signal block is re-estimated using the updated echo response estimate, and the result is subtracted from the stored i-th signal block $r_i$ in step 320 according to eq. (15a). Since for all iterations following the first one a decision vector estimate $\hat{x}_i^{(I)}$ is available from previous iterations, e.g. stored in the buffer 136 of the CC 130, the processing continues with computing the cyclic echo in step 330, and adding thereof to the IBI-corrected signal block obtained in step 320 according to eq. (15b); the resulting cyclically updated i-th received signal block $y_i^{(I+1)}$ is frequency equalized and demodulated in step 370 as described hereinabove with reference to step 350, resulting in an updated hard decisions vector $\hat{x}_i^{(I+2)}$.

In a next step 355, a pre-determined iteration-end condition is checked, and if satisfied, the hard decisions vector $\hat{x}_i^{(I+2)}$ is output from the IHDE 105 for decoding; otherwise, the steps 360-315-320-330-365-370-355 are iteratively repeated until the pre-determined iteration-end condition is satisfied.

In one embodiment, the predetermined iteration-end condition is reaching a predetermined maximum number of iterations. In other embodiments, step 355 involves computing an error function from the current hard decision vector $\hat{x}_i^{(I)}$ obtained in the latest iteration. In one such embodiment the error function can be computed as a signal-to-decision error ratio (SDR) defined by a normalized Euclid distance between a current frequency-equalized "soft" block vector $x_i^{(I)}$ and a respective estimated decision vector $\hat{x}_i^{(I)}$:

$$SDR(I) = \frac{\sum_{m=0}^{N-1} |\hat{x}_i^{(I)}(m)|^2}{\sum_{m=0}^{N-1} |\hat{x}_i^{(I)}(m) - x_i^{(I)}(m)|^2} \tag{18}$$

Figure 6:
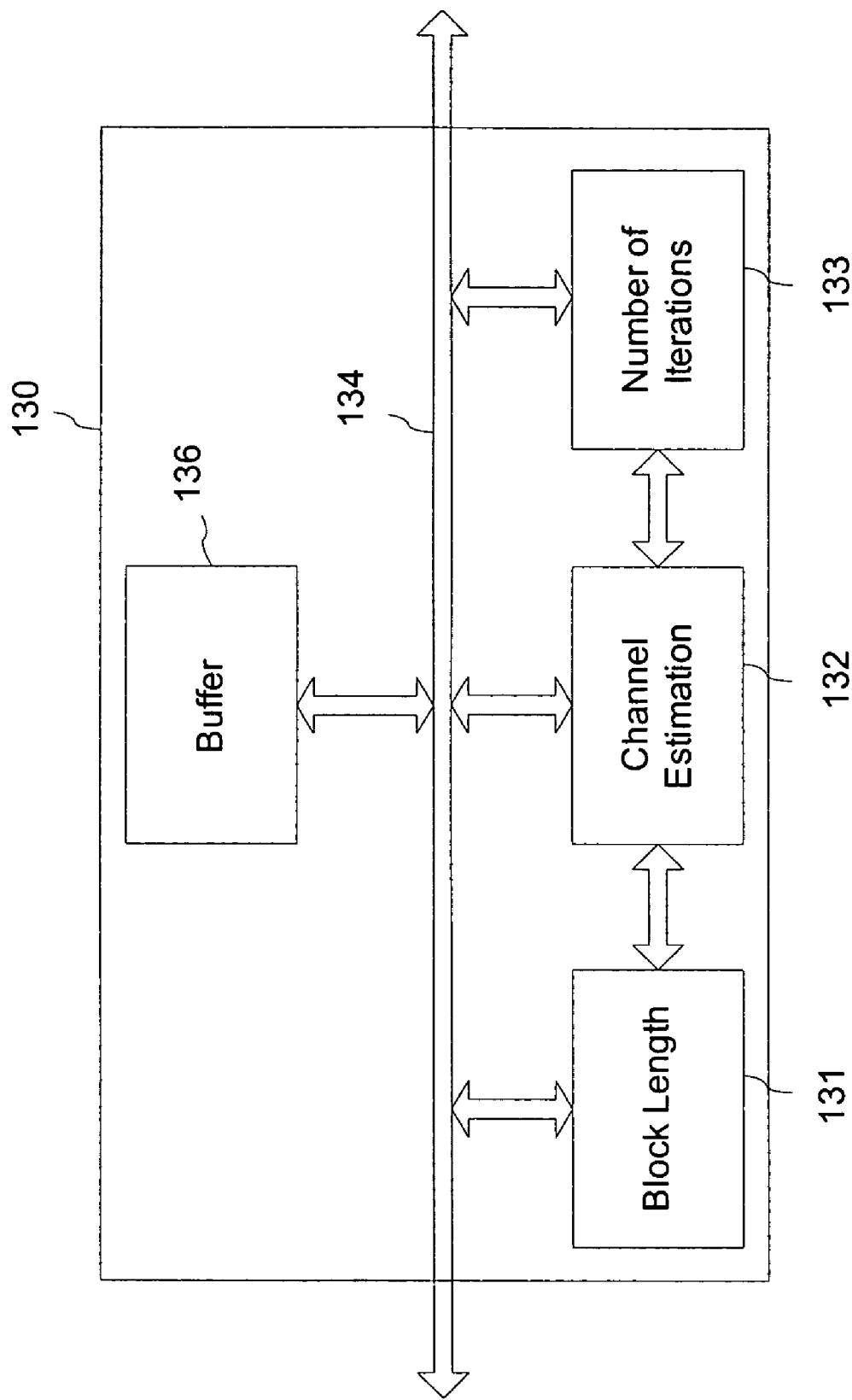
FIG. 6 is a schematic diagram of the central controller unit of the iterative hybrid-domain block equalizer shown in FIG. 3

In one embodiment of the IHDE 105, the SDR(I) at I-th iteration is computed by an SDR computer 133 shown in FIG. 6, which illustrates internal functional structure of the central controller 130 of the IHDE 105 shown in FIG. 3. Apart from the SDR computer 133, the CC 130 includes the buffer 136 as described hereinabove, a channel estimator 132, and a block size computer 131, also referred to herein as the block computer 131, which function will be described hereinafter. The channel estimator performs the initial channel estimation, and computes and updates the frequency response function $h_f$ and the echo response function $C_T$ as described herein with reference to equations (15a)-(15c) and (19a)-(19c). In the embodiment shown in FIG. 6, the internal blocks 136, 131, 132 and 133 of the CC 130 communicate internally and with respective units of the IHDE 105 using a common bus 134, which provides physical means to support the data transfer links functionally represented in FIG. 3 by thick and thin arrows terminating ah the central controller block 130.

The SDR computer 133 receives at each iteration the frequency-equalized signal block $x_i^{(I)}$ and the vector of decisions $\hat{x}_i^{(I)}$ from the IDFT/Decisions unit 140, and compares it with a pre-determined threshold value ϵ stored in a memory of the CC 130, e.g. in the buffer 136. If the threshold is reached, i.e. the iterative process converged so that $$SDR(I) < \epsilon, \tag{18a}$$

the CC 130 sends a signal to the ICU 142, which switches the output of the IDFT unit 140 to the P/S controller 145 from forming a serial output signal in the form of a decoded symbols sequence. Otherwise, the ICU 142 directs the decision vectors to units 165 and 160 for the cyclic and IBI echo computation, respectively, to continue the iterations until either condition (18a) is satisfied, or a maximum number of iterations is reached.

The hereinabove described embodiment of the method of the present invention is designed to provide channel equalization iteratively, while simultaneously updating an initial tentative channel estimation. If the channel can be considered static at least within a certain time interval greatly exceeding the block length, the aforedescribed method results in a suitably accurate channel estimation after processing the first few blocks of the received signal, or even after processing just one block. In other embodiment, the initial channel estimation can be sufficiently accurate. In both cases, the aforedescribed iterative updating of the channel estimate is not required, as the initial estimates of the frequency response function $h_f$ and the echo response function $C_T$ can be used throughout the iterations.

Figure 7:
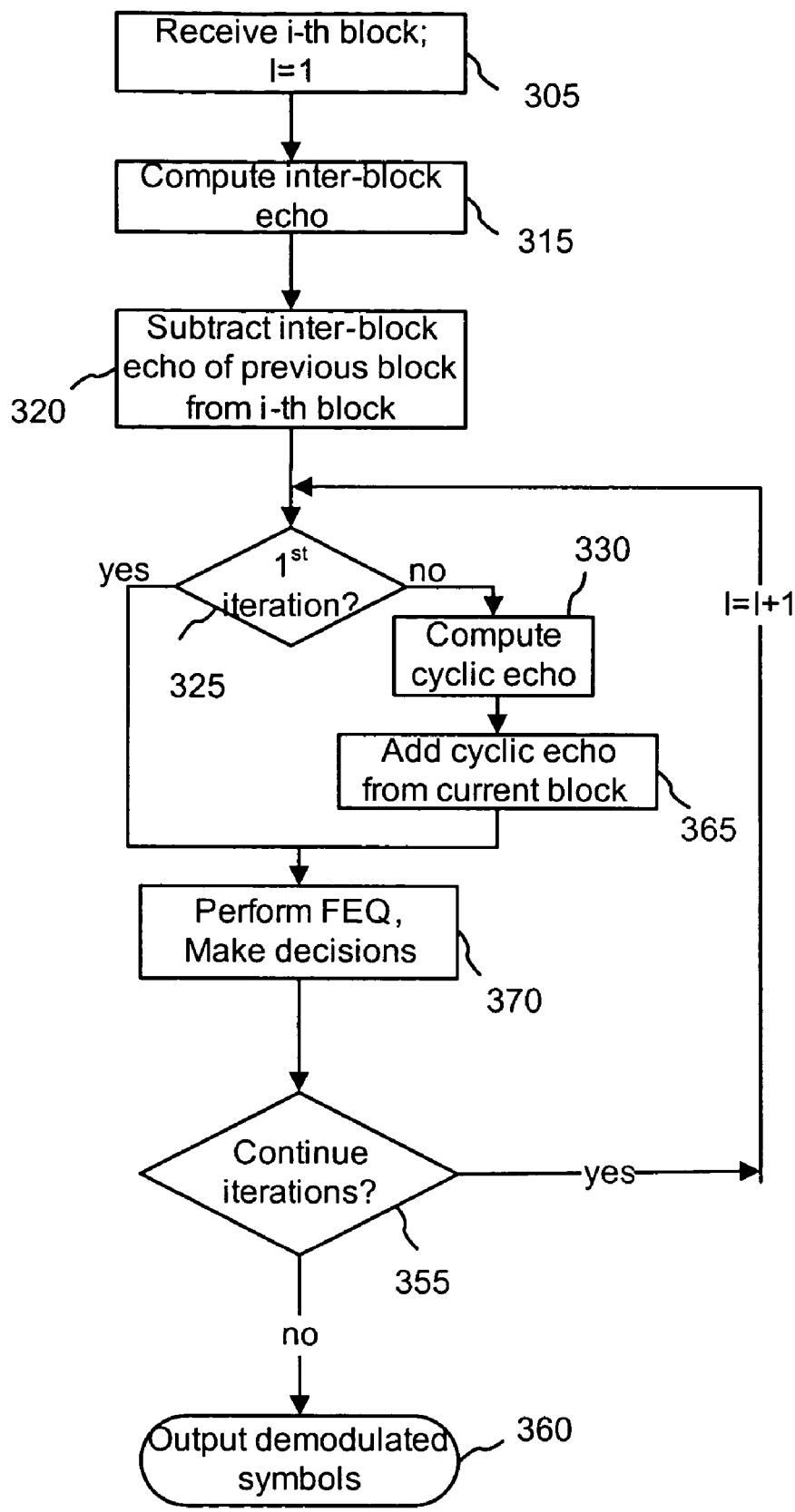
FIG. 7 is a flowchart of the iterative equalization method of the present invention in a second embodiment thereof.

FIG. 7 illustrates a simplified embodiment of the iterative hybrid-domain method of signal equalization of the present invention, which can be used for a known channel estimate and known decisions $\hat{x}_{i-1}$, for the preceding (i−1) block.

In this embodiment, the method is based on the equations $$z_i = r_i - C_T \hat{x}_{i-1}, \qquad (19a)$$

$$y_i^{(l)} = z_i + C_T \hat{x}_i^{(l)}, \qquad (19b)$$

$$x_i^{(l)} = IDFT\left\{ \frac{DFT\{y_i^{(l)}\}}{h_f} \right\} \qquad (19c)$$

This simplified embodiment of the method is illustrated in FIG. 7. Note that in the method charts shown in FIG. 5 and FIG. 7, like steps are labeled with like referenced numerals, so that the description of respective steps of the first embodiment of the method given hereinabove with reference to FIG. 5, is also applicable to like labeled steps of the simplified method, with the exception that the channel estimate is not updated, and equations (19a)-(19c) are used in place of equations (15a)-(15c). Note also, that the interlock echo term $e_{i-1} = C_T \hat{x}_{i-1}$ and the IBI (inter-block echo) corrected signal block $$z_i = r_i - C_T \hat{x}_{i-1} = r_i - e_{i-1} \qquad (20)$$

can now be computed only once and stored e.g. in the buffer 136 to be used in subsequent iterations of steps 330-365-370-355 for removing the effect of intra-block interference (IABI) by iterating the frequency-domain equalization in the forward path using the forward FEQ circuit 152, and the time-domain cyclic block correction/update in the feedback path using the IABI feedback loop 143-165-167 as shown in FIG. 3.

Block Size

According to one aspect of the invention, the block size N, which is used in the present invention and also referred to herein as the block length, is selected adaptively in dependence on the channel conditions, so as to provide guaranteed performance at a minimal complexity of the equalizer 105. The block length N determines the size of the DFT and IDFT operations performed by units 125 and 140 of the IHDE 105, and therefore to a large extent controls the computational load associated with the equalization method of the present invention. However, to ensure fast convergence of the iterative interference cancellation process described hereinabove and reduce the number of iterations, the block size N should be substantially greater than the channel length L.

At the beginning of the operation of the receiver 100, when channel conditions are not yet known, the block size N is set to a pre-determined value $N_0$ which is preferably selected to be substantially, e.g. 20 times, longer than a maximum expected value $L_{exp}$ of the CIR length L, depending on application.

Figure 8:
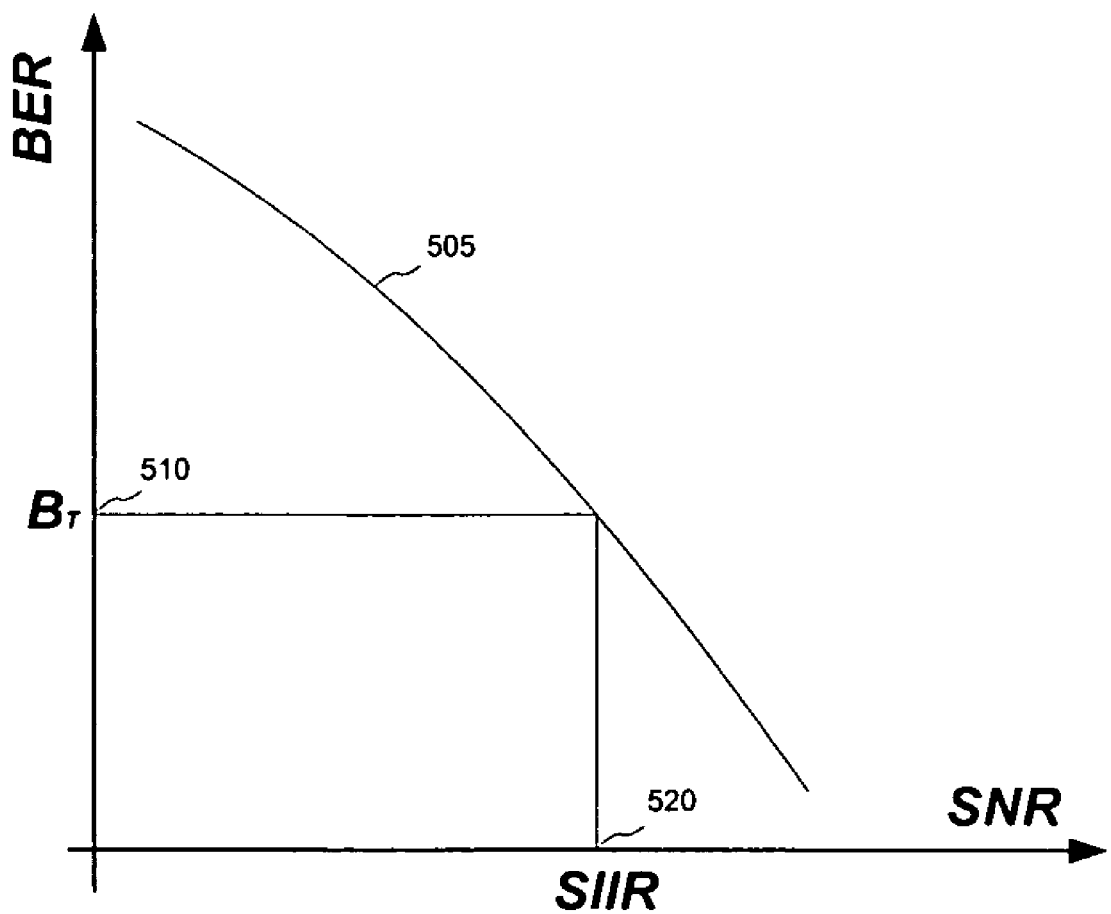
FIG. 8 is a plot illustrating the process of determining a target signal-to-interference ratio.

With reference to FIG. 8, in one embodiment of the invention the block size N is computed by the block size computer unit 131 (see FIG. 6) using a parameter that will be referred herein as the signal to IBI and IABI ratio (SIIR), or as a signal-to-echo ratio, which for a given received signal block is defined as:

$$SIIR = \frac{NE_s}{E_e} \quad \text{where} \qquad (21)$$

$$E_s = \sum_{n=0}^{L-1} h_n^2 \qquad (22)$$

is the variance of the received ATSC signal, and is also an average normalized received signal energy per symbol $E_s$. $E_e$ is a total normalized echo signal energy within a current block that includes both the IBI and IABI signal components within the current received signal block $r_i$; if the block length N is much longer than the impulse response of the channel (L), $$E_e = 2\sum_{n=0}^{L-1} \sum_{k=0}^{n} h_k^2. \qquad (23)$$

For a satisfactory reception of the ATSC signal, the receiver 100 has to ensure that a pre-determined minimum value $B_T$ of the Bit Error Rate (BER) at the output of the receiver 100 is not exceeded. On the other hand, different applications may have different performance requirements, i.e. different target BER values. Accordingly, in one embodiment of the invention a pre-determined look-up table is stored in a memory of the CC 130, e.g. in the buffer 136, that relates different target BER values to respective SIIR values; this look-up table can be obtain by varying the block size while receiving an ATSC signal under constant interference conditions, and measuring the BER values for the demodulated and decoded received signal at the output of the receiver 100. Obviously, if the receiver is to operate at a pre-determined constant BER requirement, the look-up table can store a single SIIR value.

By way of example, FIG. 8 shows a measured BER vs. SIIR dependence 505, and illustrates a process of determining a required SIIR value 520 for a given BER value 510.

Figure 9:
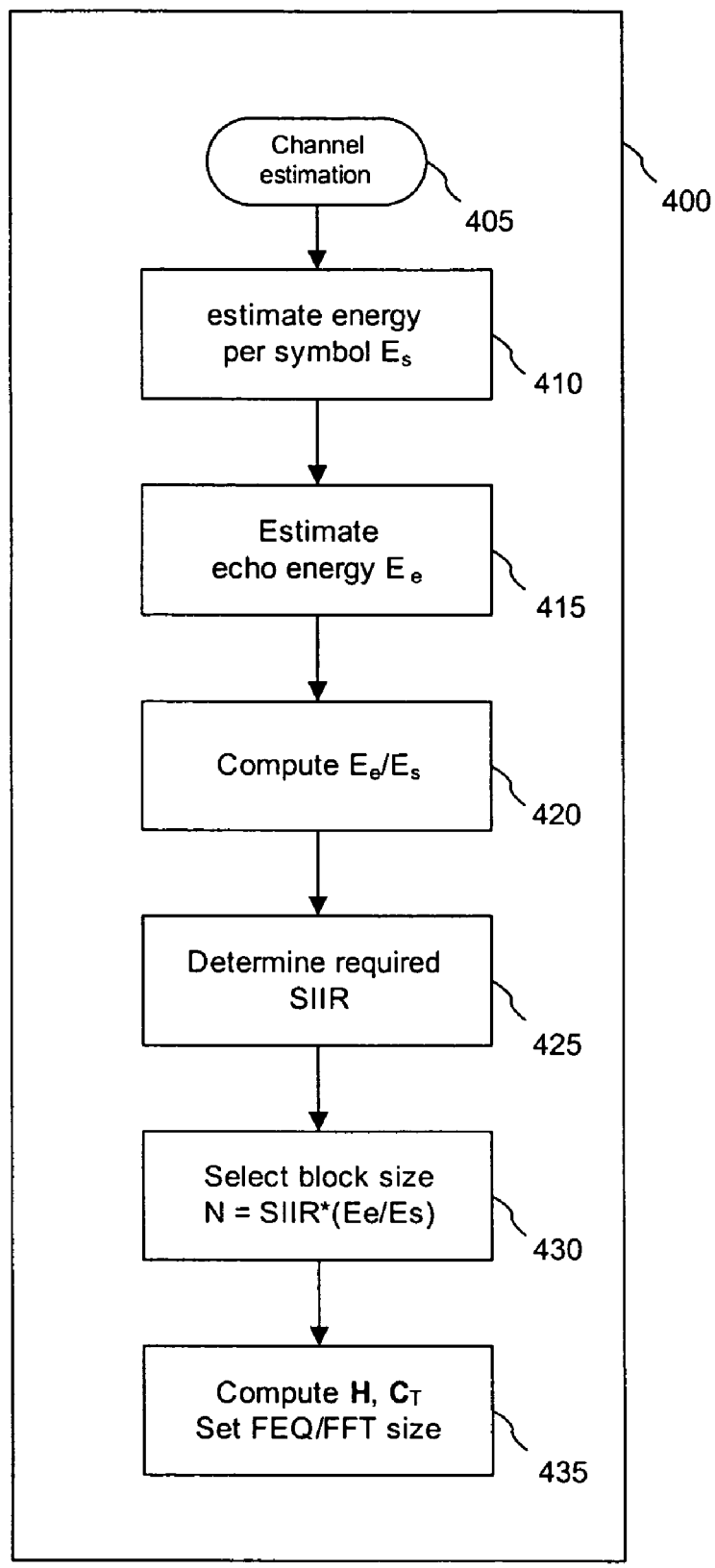
FIG. 9 is a flow chart of the method of selecting the block size for the iterative hybrid-domain block equalizer of the present invention.

FIG. 9 illustrates the process of determining the block size N according to this embodiment of the invention; the process is implemented within the block computer 131.

The process starts with step 405, wherein the results of channel estimation performed by the channel estimator 132 are provided to the block computer 131 in the form of the CIR vector h.

Next, in step 410 the average normalized received signal energy per symbol $E_s$ is estimated using equation (22);

In step 415, the average normalized received signal energy per symbol $E_s$ is estimated using equation (22);

In step 420, a symbol-to-echo energy ratio ($E_s/E_e$) is computed;

In step 452, a required SIR value is determined from the stored look-up table; and, In step 430, the block size N is determined using the following equation (24):

$$N = SIIR \cdot (E_s/E_e) \quad (24)$$

In a final step 435, the so determined block size N is passed back to the channel estimator 132, which then completes the procedure by computing estimates for $h_f$ and $C_T$ for the determined block size N. The so determined block size N is also passed to units 125, 135 and 140 of the forward FEQ circuit 152 to set the DFT/IDFT size, and to the S/P and P/S converters 120, 145 to adapt their size accordingly.

In one embodiment of the invention, the block size N is computed using the aforedescribed approach every time when a new CIR estimate is performed; however, the block size update performed in the last step 435 can be triggered if the newly determined block size N substantially differs from a currently used value.

Pruning FFT

As have been stated herein above, in preferred embodiments the DFT and IDFT converters 125 and 140 operate using computationally efficient (I)FFT algorithms; still, the (I)FFT operations used in steps 310, 335, 350, and 370 determine to a large extent the overall computational complexity of the above described method of the hybrid time-frequency domain equalization of the present invention.

However, computational efficiency of the method can be further significantly reduced by using pruning (I)FFT in iterations where the IBI and cyclic echoes $e_{i-1}$, $e_i$ are computed. Indeed, as can be seen from equation (5) for the echo response function matrix $C_T$ and e.g. an equation $e_{i-1} = C_T \hat{x}_{i-1}$ for the inter-block echo, only a fraction of the decision vector corresponding to the end portion of length (L−1) of the current or previous signal block is needed for computing the echo correction signals $e_{i-1}$, $e_i$ in each iteration. Consequently, once the channel length L is known, the computational load can be substantially lighten by using the (I)FFT pruning technique, which is known in the art of digital Fourier transform, i.e. by eliminating operations in the FFT (unit 120) and IFFT (unit 140) that result in the generation of the last (N−L) elements of the frequency equalized signal blocks $x^{(f)}$. Each of the respective (I)FFT operations after pruning will only need $$N_{mp} = 2N \lfloor \log_2 L \rfloor - 2N - 4L + 4 + \frac{2NL}{2^{\lfloor \log_2 L \rfloor}}$$

real multiplications and $$N_{add} = 3N \lfloor \log_2 L \rfloor - 2L - 3N + 2 + \frac{3NL}{2^{\lfloor \log_2 L \rfloor}}$$

real additions, where the function $\lfloor \ \rfloor$ returns the integer part of an argument.

Channel Length Determination

Accordingly, in another aspect of the invention the step 301 of initial channel estimation includes the step of channel length determination, which is then used in pruning the (I)FFTs performed by the units 125 and 140 in FIG. 3.

In one embodiment, the channel length estimation is performed by estimating an autocorrelation function $R_{rr}$ of the received ATSC signal $r = \{r_n\}$, which is defined as $$R_{rr}(m) = E\{r(n)r^*(n+m)\}, \quad (24)$$

wherein $E\{a\}$ denotes math expectation of a, and the superscript '*' denotes the operation of complex conjugation.

Using the randomized nature of the transmitted ATSC signal s that results in the received signal r, it can be shown that the autocorrelation function $R_{rr}(m)$ approximates a correlation function of the channel impulse response and its time domain inverted version $$R_{rr}(m) \approx R_{hh}(m) = h(m)^* \otimes h(-m) \quad (25)$$

where $\otimes$ denotes the operation of convolution.

Therefore, in this embodiment of the invention the duration L of the channel impulse response h is estimated simply by computing the autocorrelation function of the received signal $R_{rr}(m)$, which has a full length of (2N−1), and estimating an effective width of it central portion, e.g. by truncating a tail of $R_{rr}(m)$ that has a small amplitude.

To begin the estimation of L, a time selection window with a pre-determined maximum expected channel length is weighted with the computed auto-correlation function of the received signal $R_{rr}(m)$. The auto-correlation function is symmetrical and only one half of the function is needed for the channel length estimation. The window size is then gradually reduced sample by sample. If the amplitude of the sample is less than a pre-determined threshold, then the sample is discarded. This process continues until a first significant peak in the auto-correlation function is found. The channel length L is determined as the length from the central peak to this first significant non-zero peak.

Once the channel length L is determined, it is passed to the DFT and IDFT blocks 125, 140 for use in the pruning (I)FFT algorithms used by these blocks. In one embodiment, it is also passed to the S/P converter 120 for determining the block overlap size, as described herinabove with reference to steps 301 and 305 of FIG. 5. In the embodiment illustrated in FIG. 3 and FIG. 5, the described received signal correlation technique for determining the channel length is implemented within the channel estimator 132 of the CC 130, which receives the input signal blocks from the S/P converter 120 via the parallel connection 117. In other embodiments, the correlation technique for determining the channel size L can be implemented in receiver blocks prior to the IHDE 105, e.g. in the SyncD unit 115, as the correlation technique does not require any pre-processing of the received signal.

Figure 10:
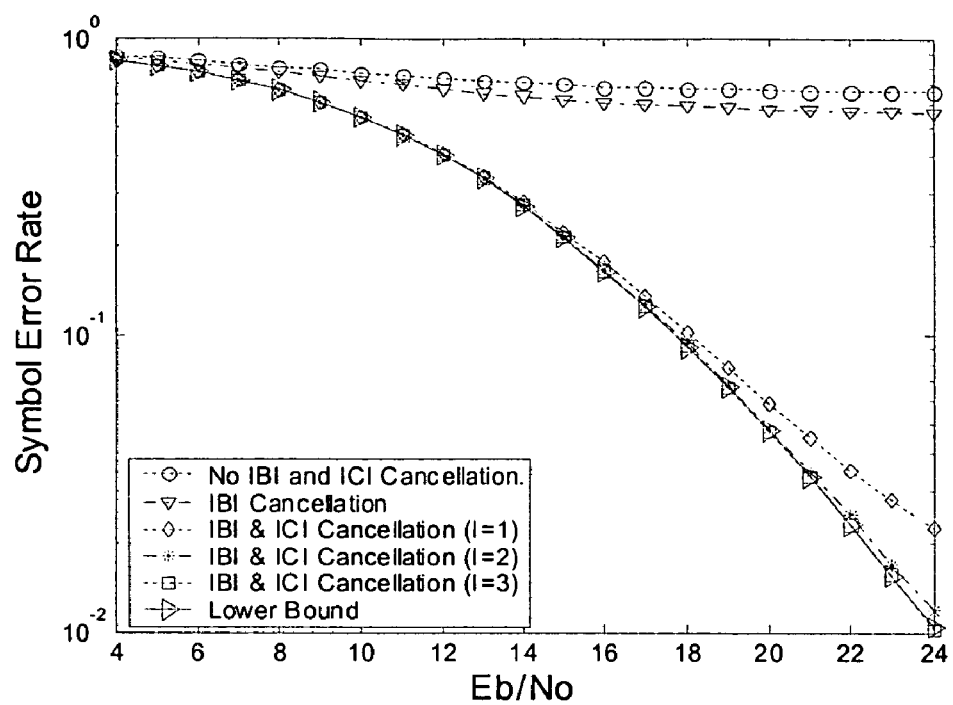
FIG. 10 is a graph showing simulated performance of the iterative hybrid-domain block equalizer of the present invention.
Figure 11:
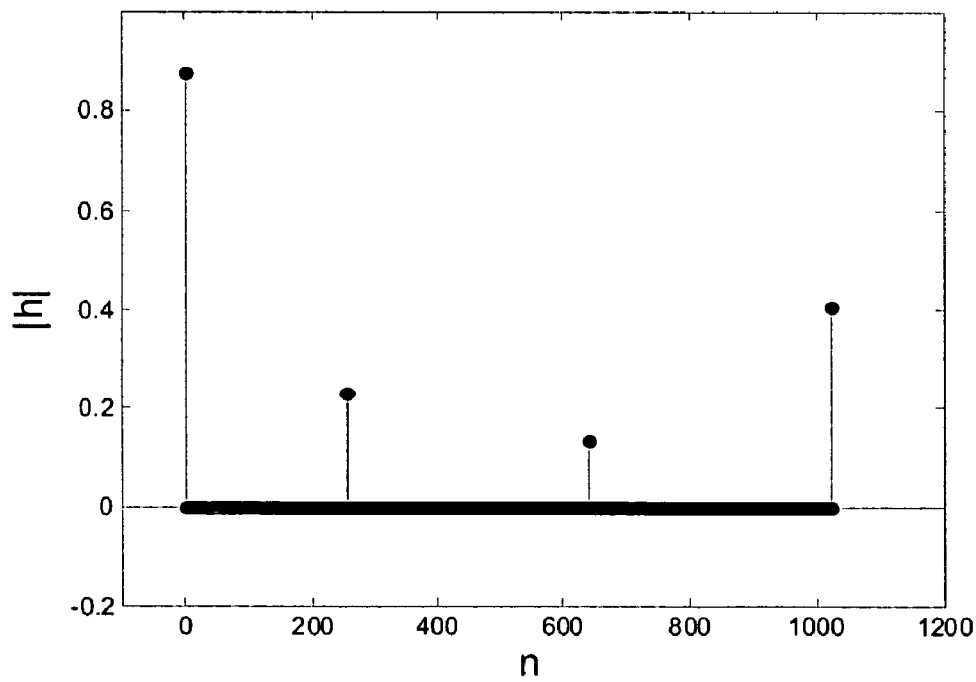
FIG. 11 is a plot of a multipath channel impulse response used in simulations of FIG. 10.

Advantageously, the iterative hybrid-domain block equalization method of the present invention enables efficient demodulation of received signals in the presence of multipath interferences resulting in echoes with very long delay spreads. By way of example, FIG. 10 shows the dependence of a simulated symbol error rate (SER) at the decoder output of the receiver 100 on the signal to noise ratio at different stages of the aforedescribed iterative method. The signal at the input of the receiver was corrupted by propagation through a channel characterized by a CIR that has an effective length L exceeding 1000 symbol intervals, as shown in FIG. 11. The term "ICI cancellation" used in the legend of FIG. 10 denotes the cyclic echo addition operation, e.g. as described by equations (15b) and (19b) hereinabove. As seen from FIG. 10, even in the case of such a long CIR the iterative method converges to a lower SER bound after only 2 iterations.

Other advantageous of the iterative hybrid-domain block equalization method and apparatus of the present invention include: i) no training sequence or statistical signal information, e.g. relating to the modulation scheme, needs to be included in the transmitted signal is needed; ii) the channel length estimation algorithm of the present invention can work at a very low SNR. The lower of the SNR in the received signal, the longer the received signal samples will need to be accumulated for an accurate channel estimation, limited by the channel coherence time; iii) the channel length estimation can be performed without or prior to signal synchronization or demodulation.

The preceding description has been directed towards a DTV communication system that uses the ATSC signal format. However, the method and apparatus of the present invention can be equally applied for iterative hybrid-domain equalization of other types of communication signals that can be subjected to sever multipath interference and do not have a cyclic prefix, with possibly minor modifications that would be apparent to those skilled in the art.

The present invention has been fully described in conjunction with the exemplary embodiments thereof with reference to the accompanying drawings. Of course numerous other embodiments may be envisioned without departing from the spirit and scope of the invention; it is to be understood that the various changes and modifications to the aforedescribed embodiments may be apparent to those skilled in the art. Such changes and modifications are to be understood as included within the scope of the present invention as defined by the appended claims, unless they depart therefrom.

We claim:

1. In a wireless receiver for receiving a signal via a communication channel subjected to multi-path interference, the wireless receiver comprising an RF receiving unit, an analog to digital converter, and digital processing hardware, said signal transmitted without a cyclic prefix using a single carrier frequency, a method of channel equalizing comprising:
    a) receiving the transmitted signal with the RF receiving unit, and converting thereof into a sequence of samples of the transmitted signal using the analog to digital converter, each sample representing a transmitted symbol subjected to channel distortions;
    b) based on an initial channel estimation, generating, with the digital processing hardware,
        a frequency response transfer function ($h_f$) for a block of transmitted symbols of a pre-defined length, and
        a time-domain channel echo response function ($C_T$);
    c) using the digital processing hardware for iteratively equalizing blocks of samples from the received sequence of samples using a frequency-domain equalization in a feedforward path, and time-domain inter-block echo cancellation and cyclic echo correction in a feedback path.

2. A method of claim 1, wherein step (b) includes
estimating a time-domain channel impulse response function (CIR) h, and generating therefrom the time-domain channel echo response function ($C_T$), and the frequency response transfer function ($h_f$).

3. A method of claim 1, wherein step (c) comprises:
subtracting from a first end portion of a current block of samples an estimated contribution of an inter-block echo of a portion of the transmitted signal preceding the current block of samples; and,
adding to the first end portion of the current block an estimated cyclic echo of an opposing end portion of the current block of samples.

4. A method of claim 1, wherein step (c) comprises:
A) updating a current block of samples by subtracting from a first end portion thereof an estimated contribution of an inter-block echo, said inter-block echo produced from a portion of the transmitted signal preceding the current block;
B) performing frequency-domain equalization for the updated current block of samples using the frequency response transfer function to obtain a frequency-equalized block;
C) generating symbol estimates for the current block of samples by making decisions on samples of said frequency-equalized block;
D) estimating an echo signal from the current block of samples by applying the time-domain channel echo response function to the symbol estimates for the current block;
E) updating the current block of samples by cyclically adding the estimated echo signal from the current block to the first end portion of the current block; and,
F) repeating steps (B) and (C) to update the symbol estimates for the current block of samples.

5. A method of claim 4, further comprising iteratively repeating steps (D)-(F) until a pre-determined condition is satisfied.

6. A method of claim 5, wherein the pre-determined condition is one of: reaching a predetermined number of iterations, and reaching a pre-determined value of an error function.

7. A method of claim 5, wherein the pre-determined error function is a signal-to-decision error ratio defined by a normalized Euclid distance between a current frequency-equalized block vector and a respective estimated decision vector.

8. A method of claim 4, wherein step (F) further includes updating the frequency response transfer function and the time-domain channel echo response function using the symbol estimates for the current block of samples.

9. A method of claim 1, further comprising selecting a block size N for a current block of samples in dependence upon the communication channel conditions, wherein N is a number of samples of the transmitted signal in the current block of samples.

10. A method of claim 9, wherein the step of selecting the block size N further comprises determining a value of a signal-to-echo ratio for providing a target system performance, and the step of determining the block size N from said value of the signal-to-echo ratio.

11. A method of claim 1, wherein step (b) includes determining a length L of a channel impulse response function (CIR) of the communication channel, and wherein the frequency-domain equalization is performed using pruning fast Fourier transform (FFT) and pruning inverse fast Fourier transform (IFFT) in dependence on the CIR length L.

12. A method of claim 11, wherein blocks of samples overlap, so that a leading portion of one block is a copy of a trailing portion of a preceding block.

13. A hybrid domain channel equalizer for equalizing a signal received via a wireless communication channel in the presence of multi-path interference, comprising:
    a forward circuit having an input port for receiving an input time-domain signal and an output port for outputting an equalized time-domain signal obtained from the input time-domain signal, said forward circuit comprising a frequency-domain equalizer for performing a frequency-domain equalization of the input time-domain signal, and a decision circuit coupled between an output of the frequency-domain equalizer and the output port for providing the equalized time-domain signal; and,
    a feedback circuit connected between the output port and the input port for producing interference compensating signals from the equalized time-domain signal in the time domain, and for combining said interference compensating signals with the input time-domain signal at the input port for compensating channel generated echo components of the input signal at the input port.

14. A hybrid domain channel equalizer of claim 13, further comprising an input serial to parallel (S/P) converter for providing the input time-domain signal to the input port in blocks of N signal samples, wherein N is a block size equal to a number of signal samples in one block.

15. A hybrid domain channel equalizer of claim 13, wherein the feedback circuit comprises a first feedback loop for inter-block echo cancellation, and a second feedback loop for intra-block cyclic echo addition.

16. A hybrid domain channel equalizer of claim 15, wherein the first feedback loop comprises an inter-block echo estimator, and the second feedback loop comprises an intra-block cyclic echo estimator.

17. A hybrid domain channel equalizer of claim 16, wherein the first feedback loop comprises a memory for storing a block of N decided symbols, wherein N is a block size equal to a number of signal samples in one block.

18. A hybrid domain channel equalizer of claim 15 further comprising a logic device for passing the equalized time domain signal to the output port or to the intra-block cyclic echo estimator in dependence upon satisfying a pre-determined condition.

19. A hybrid domain channel equalizer of claim 13, further comprising:
    a subtractor for subtracting an estimated inter-block echo signal from the input time-domain signal to obtain an inter-block interference (IBI) corrected signal, and a memory for storing the IBI corrected signal.

20. A hybrid domain channel equalizer of claim 19, further comprising:
    an adder for adding an estimated intra-block echo signal to the IBI corrected signal to obtain a cyclic echo corrected signal for passing thereof to the frequency-domain equalizer.

21. A hybrid domain channel equalizer of claim 20 further comprising:
    a memory for storing the cyclic echo corrected signal and the frequency-equalized time-domain signal; and,
    a channel estimator for estimating a channel frequency response transfer function and a time-domain echo transfer function from the cyclic echo corrected signal and the frequency-equalized time-domain signal, and for providing said functions to the frequency equalizer, the inter-block echo estimator and the cyclic echo estimator.

22. A hybrid domain channel equalizer of claim 13, wherein the forward circuit and the feedback circuit are implemented in the digital processing hardware.

23. A hybrid domain channel equalizer for equalizing a signal received via a wireless communication channel in the presence of multi-path interference, comprising:
    a forward circuit having an input port for receiving an input time-domain signal and an output port for outputting an equalized time-domain signal obtained from the input time-domain signal, said forward circuit comprising a frequency-domain equalizer and a decision circuit;
    a feedback circuit connected between the output port and the input port for producing interference compensating signals from the equalized time-domain signal in the time domain, and for combining said interference compensating signals with the input time-domain signal at the input port for compensating channel generated echo components of the input signal at the input port;
    an input serial to parallel (S/P) converter for providing the input time-domain signal to the input port in blocks of N signal samples, wherein N is a block size that is equal to a number of signal samples in one block; and,
    a block computer operative to compute the block size N in dependence on an estimated relative echo energy in the input time-domain signal.

* * * * *